(No Model.)
J. D. WILSON.
ROAD CART.
No. 336,973. Patented Mar. 2, 1886.
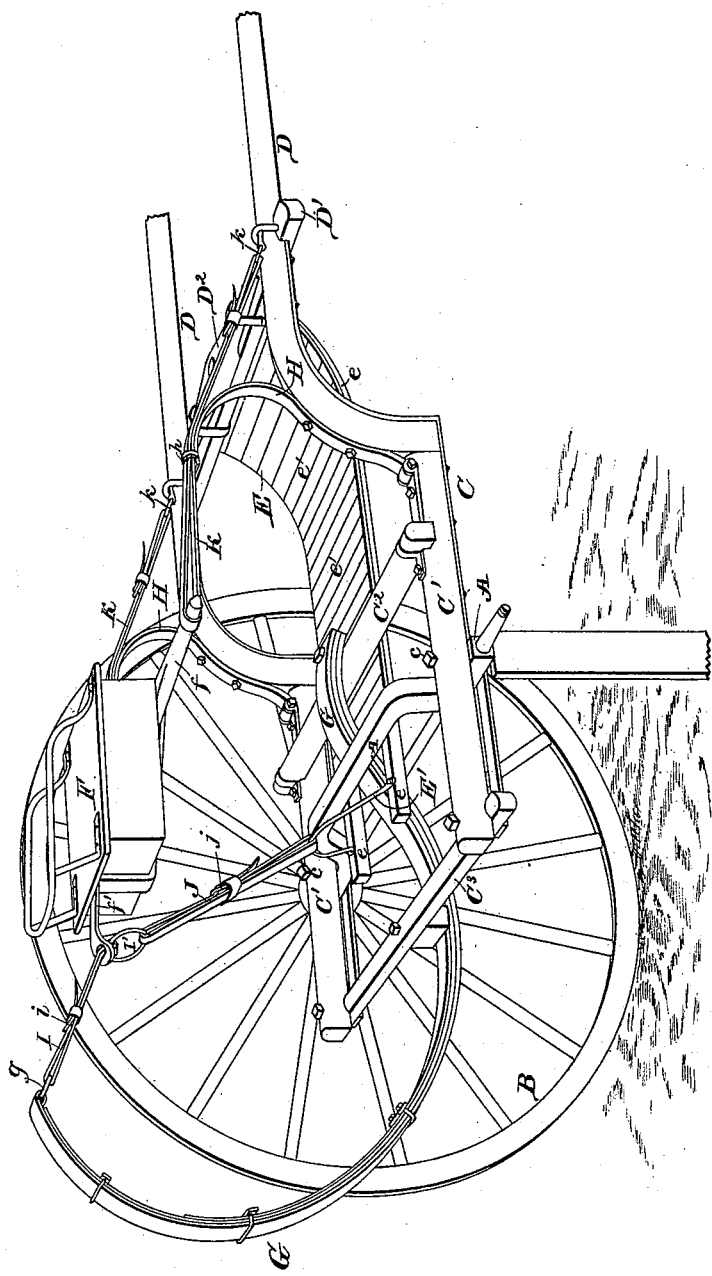
Witnesses
Inventor
John D. Wilson:
By his Attorneys
C. A. Snow & Co

UNITED STATES PATENT OFFICE.

JOHN D. WILSON, OF GREENLEAF, KANSAS.

ROAD-CART.

SPECIFICATION forming part of Letters Patent No. 336,973, dated March 2, 1886.

Application filed December 5, 1885. Serial No. 184,846. (No model.)

*To all whom it may concern:*

Be it known that I, JOHN D. WILSON, a citizen of the United States, residing at Greenleaf, in the county of Washington and State of Kansas, have invented a new and useful Improvement in Road-Carts, of which the following is a specification, reference being had to the accompanying drawing.

My invention has relation to improvements in road-carts; and the novelty consists of the peculiar construction, combination, and arrangement of the various parts for service, substantially as hereinafter fully set forth, and specifically pointed out in the claims.

The primary object of my invention is to provide means whereby the motion of the horse will be prevented from being communicated to the occupant of the vehicle; to provide means whereby the tension of the seat-supporting springs can be adjusted to carry loads of varying weights without undue strain on the said springs, and to so construct and arrange the regulating devices that they can be adjusted very quickly and conveniently, and to combine simplicity with strength and durability of construction and thorough effectiveness of operation.

In the accompanying drawing the figure is a perspective view of a road-cart constructed in accordance with my invention.

Referring to the drawing, A designates the axle; B, the carrying-wheels mounted thereon; C, the supporting-frame secured on the axle, and D the thills connected to the frame.

The supporting-frame C comprises two side bars, C', arranged near the ends of the axle and clipped or bolted thereto at or near their middle, as at $c$, a cross-bar, $C^2$, secured on the side bars in front of the axle, and a rear cross-bar, $C^3$, secured to the rear ends of the side bars behind the axle, the cross-bars being secured together by bolts, clips, or other suitable means.

The thills D are preferably curved at their rear ends, as shown, and are connected to the side bars of the frame C, said thills having a cross-bar, D', rigidly secured therein near their ends, and to this cross-bar is pivotally connected a whiffletree, $D^2$, to which the draft-animal is connected.

E represents the foot or dash board, which comprises two curved supporting-bars, $e$, arranged a suitable distance apart, and bolted or otherwise secured at their front ends to the cross-bar D' of the thills, and near their rear ends to the cross-bar $C^2$ of the seat-carrying frame C, and to these side bars are secured the transverse boards or planks $e'$, on which rest the feet of the occupant. The rear ends of the side bars, $e$, of the foot-support are extended below and in rear of the axle A, or they may be arranged above the said axle, and they are provided with a curved connecting-loop, E', the function of which will presently appear.

F designates the driver's seat, having a cross-bar, $f$, rigidly secured on its lower front end, and a rearwardly-extending arm or loop, $f'$, and said seat is supported by springs G H, of approximately inverted-C-shaped form. The spring G is arranged centrally of the vehicle and in rear of the frame and seat thereof, the lower front end of the spring passing beneath the rear cross-bar, $C^3$, and axle A, and is bolted to the cross-bars $C^2 C^3$. The upper end of the spring G is arranged above or in the plane of the seat and in rear thereof, and it has a ring, loop, eye, or other equivalent device, $g$, to which is connected an adjusting-strap, I, having a buckle, $i$, the tongue of which is adapted to engage one of a series of apertures in one end of the strap. To the lower end of this strap I is connected a ring, I', and to the ring an adjusting-strap, J, is connected, said strap J having a buckle, $j$, and adapted to engage the loop E', as shown. The loop or arm $f'$ of the seat F fits loosely over the lower end of the strap I, and the spring G and strap I J serve to support the rear end of the seat F and permit it to yield vertically, laterally, or longitudinally, as will be presently described. When the driver is seated on the seat his weight will serve to depress the rear end thereof and force the loop or arm $f'$ into engagement with the ring I' and thus draw upon the upper end of the rear supporting-spring, G. The springs H are arranged at the front of the vehicle, near the sides thereof, the lower ends of which are bolted or clipped to the side rails and rear ends of the thills, and the upper ends thereof extended rearwardly and are provided with a loop or clasp, $h$, which embraces an adjusting-strap, K, one of which is provided for each of the front springs, H. The rear ends of the straps K are fitted over the ends of the cross-bar $f$, and they may be retained thereon by any suitable device—as, for instance, a flange on the ends of said bar—and the front ends of the said straps are passed through loops or rings $k$, rigidly secured on the rear ends of the thills, each strap having a buckle the tongue of which fits in one of a series of apertures of one end thereof, to permit the adjustment of the strap. The seat is thus loosely suspended above the frame C out of engagement therewith, and is capable of a vertical or lateral and longitudinal swinging movement on the springs, while said springs give the same the required resilient movement when passing over rough roads.

By thus yieldingly suspending the seat out of engagement with supporting-frame, all movement of the horse which is communicated to the said frame is prevented from becoming transmitted to the occupant, thus insuring an easy and agreeable movement to him.

Various changes in the forms and proportion of parts and in the details of construction may be made without departing from the principle or sacrificing the advantages of my invention, the essential features of which have been explained.

By taking up or letting out the flexible adjusting-straps the tension or force of the springs can be increased or decreased and thus regulated to suit loads of various weights.

Having thus fully described my invention, what I claim as new, and desire to secure by Letters Patent, is—

1. In a road-cart, the combination of an axle, a frame rigidly supported thereon, the thills rigidly connected to the frame, a seat, a back spring rigidly secured to the frame at one end and having its upper end left free, the front springs rigidly connected to the frame and the thills and having free upper ends, and connections between the free ends of the springs and the seat, whereby the latter is free to move vertically or laterally independent of the frame, substantially as described.

2. The combination of an axle, the springs, a seat, and adjustable connections between the seat and the springs to vary the tension of the latter, substantially as described.

3. The combination of an axle, a frame, springs rigidly secured at one end to the frame, a seat, and adjustable straps connecting the seat and the free ends of the springs to vary the tension of the latter, substantially as described.

4. The combination of the axle, a frame, a rear curved spring secured to the frame, adjusting strap or straps between the upper end of the said spring and the frame, and a seat yieldingly mounted at its front end and loosely connected to the adjusting-strap, substantially as described.

5. The combination of the axle, a frame, a rear curved spring secured to the frame, a flexible connection between the upper end of the spring and the frame, and a seat supported at its front end and loosely connected at its rear end to the flexible connection of the spring, substantially as described.

6. The combination of the axle, a frame, a spring secured thereto and arranged in rear of the same, adjusting-straps secured to the upper end of the spring, a bow to which the lower strap is connected, and a seat having an arm or loop loosely connected to the adjusting-strap, substantially as described.

7. In a road-cart, the combination of an axle, a frame rigidly secured thereon, the rigid thills connected to the frame, a seat, a rear spring secured to the frame at one end, the front springs secured to the thills and frame, the adjustable straps I J, having the seat connected thereto, and the straps $k$, secured to the front springs and connected to the thills and seat, substantially as described.

8. The combination of the axle, a frame, an elevated seat, a rear spring secured to the frame, adjusting-straps I J, having a retaining-ring, curved springs H, adjusting-straps K, the thills having loops, and a bow, E', secured to the frame, substantially as described.

9. In a road-cart, the combination of the frame, the thills connected rigidly thereto, springs H, rigidly secured at one end of the frame and thills, a seat, and adjustable straps K, secured to the free ends of the springs and connected loosely with the thills and the seat, substantially as described.

In testimony that I claim the foregoing as my own I have hereto affixed my signature in presence of two witnesses.

JOHN D. WILSON.

Witnesses:
J. B. FURRID,
W. P. MUDGETT.